United States Patent [19]

Minervini

[11] Patent Number: 5,010,670

[45] Date of Patent: Apr. 30, 1991

[54] AUTOMOBILE WINDOW DISPLAY APPARATUS

[76] Inventor: Mario J. Minervini, 3192 Blackwell Dr., Vista, Calif. 92084

[21] Appl. No.: 451,456

[22] Filed: Dec. 14, 1989

[51] Int. Cl.$^5$ .............................................. G09F 21/04
[52] U.S. Cl. ...................................... 40/593; 40/617; 116/28 R; 116/42; 224/311
[58] Field of Search ................. 40/593, 591, 617, 904; 224/311, 312; 116/28 R, 42; 160/370.2

[56] References Cited

U.S. PATENT DOCUMENTS

| | | |
|---|---|---|
| 1,167,372 | 1/1916 | Bemiss . |
| 1,179,497 | 4/1916 | Bemiss . |
| 1,227,387 | 5/1917 | Christie . |
| 1,267,790 | 5/1918 | Nordstrom . |
| 1,277,483 | 9/1918 | Rogers . |
| 1,420,750 | 6/1922 | Riblet .................................... 116/42 |
| 1,465,405 | 8/1923 | Arrington . |
| 1,543,168 | 6/1925 | Larose ................................... 40/617 |
| 2,671,423 | 3/1954 | Mead ................................ 116/28 R |
| 2,671,977 | 3/1954 | Lingard .................................. 40/904 |
| 2,843,952 | 7/1958 | Zgraggen . |
| 3,141,253 | 7/1964 | Bartrüm . |
| 3,168,070 | 2/1965 | Verney, III . |
| 3,293,785 | 12/1966 | Krei . |
| 3,383,788 | 5/1968 | Patzer .................................... 40/593 |
| 4,055,012 | 10/1977 | Cote . |

FOREIGN PATENT DOCUMENTS

| | | | |
|---|---|---|---|
| 285998 | 5/1931 | Italy ....................................... 40/617 |
| 406695 | 8/1966 | Switzerland ........................... 40/617 |
| 305783 | 2/1929 | United Kingdom .................. 40/617 |

*Primary Examiner*—James R. Brittain
*Assistant Examiner*—J. Hakomaki
*Attorney, Agent, or Firm*—Fulwider, Patton, Lee & Utecht

[57] ABSTRACT

Automobile window display apparatus which includes a display panel for carrying a message. The panel is pivotally mounted to the rear window molding for movement between a retracted position and a vertical display position in which the message is visible through the rear window. A cord attached to the lower edge of the display panel extends forwardly and is hooked onto the rear view mirror mount. This allows the driver to unhook the cord for rearward movement under the weight of the panel as the panel drops to its display position.

3 Claims, 1 Drawing Sheet

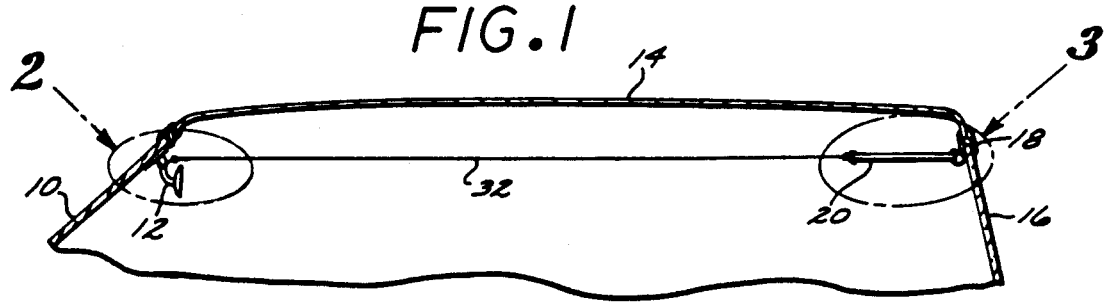
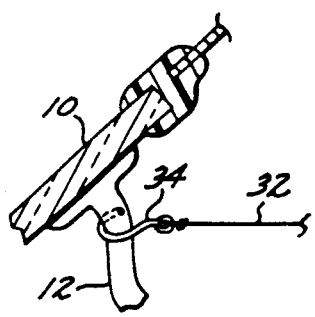
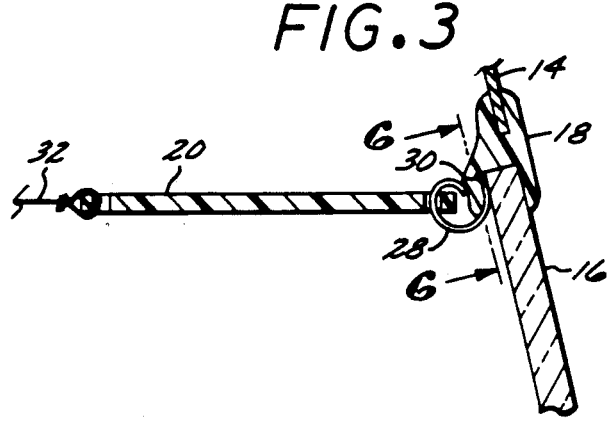
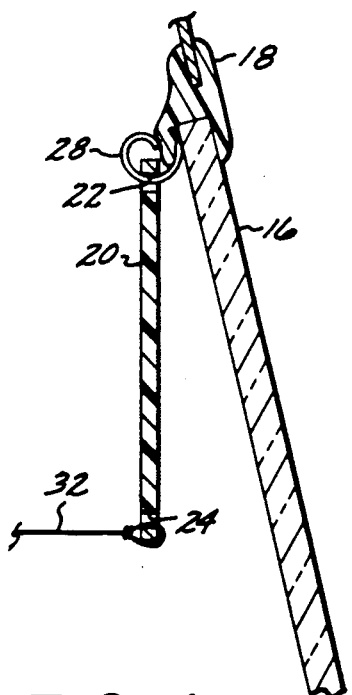
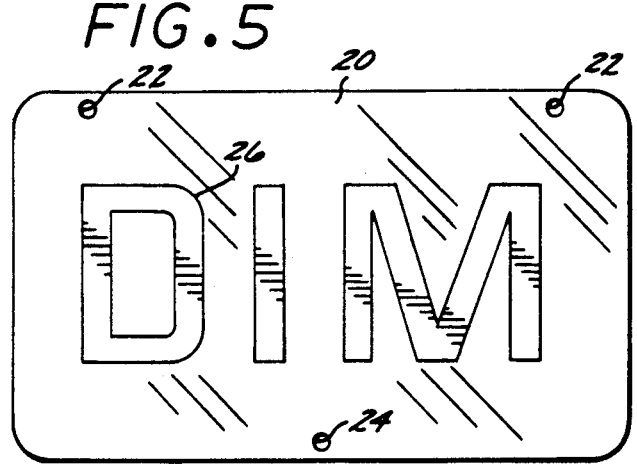
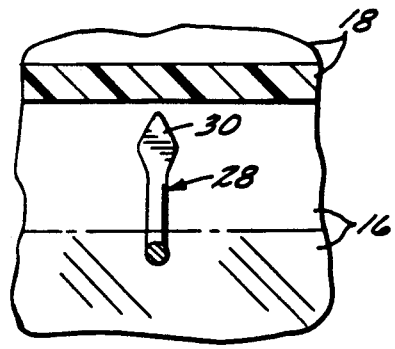

AUTOMOBILE WINDOW DISPLAY APPARATUS

BACKGROUND OF THE INVENTION

1. Field of the Invention

The present invention relates generally to automobile window display apparatus and more particularly to such an apparatus which is manually operated to allow a display panel to drop into operative position of its own weight.

2. Description of the Prior Art

Several devices are known for displaying messages visible from outside an automobile through its rear window. These devices are useful to pass information to the drivers of following vehicles. Such messages can signal the following driver to dim his or her vehicle lights, that there is a hazard ahead, that the vehicle is following too closely, etc.

One such sign display is disclosed in U.S. Pat. No. 3,383,788 (Patzer). The display comprises several flat display panels pivotally supported at their lower edges to the rear window deck. A separate cable attached to the upper edge of each panel extends upwardly and through several fittings secured to the roof of the vehicle. The cables terminate in a control panel having appropriate slide buttons which can be selectively moved by the driver to pull upon one of the cables. The cable raises the associated panel from a lower position adjacent the rear window deck to an upright position in which a message on the panel can be viewed through the window. The amount of travel required of a slide button to bring a panel to its upright position is considerable, which results in a somewhat cumbersome and bulky control panel. Furthermore, cable support fittings on the roof are unsightly and must be specially installed.

U.S. Pat. No. 3,141,253 (Bartram) does not require any fittings for mounting message panel operating cables, but the system disclosed is limited to a front window or windshield display. The panel is manually flipped up or down by the driver and therefore the system is not suitable for a rear window display. This shortcoming is also applicable to the sign systems disclosed in U.S. Pats. Nos. 3,168,070 (Verney) and 4,055,012 (Cote).

Automatic rear displays are also known, one such device being disclosed in U.S. Pat. No. 2,843,952 (Zgraggen). However, such devices are relatively expensive and involve considerable installation expenses.

SUMMARY OF THE INVENTION

According to the present invention, an automobile window display apparatus is provided which includes a display panel pivotally mounted at its upper extremity to structure of the automobile adjacent the automobile rear window. A cord is attached to the lower extremity of the panel, and extends to a position adjacent the driver. In one embodiment the forward end of the cord carries a hook so that the cord can be releasably secured to the usual rear view mirror mount. With this straightforward arrangement the driver can easily display a message visible from outside the automobile through the rear window by merely unhooking the cord from the rear view mirror mount and moving his arm rearwardly. This provides sufficient slack in the cord to permit the display panel to pivot of its own weight from its upper retracted position to a lower display position. Raising the display panel is easily accomplished by re-hooking the cord onto the mirror mount.

The display panel is preferably made of transparent material so the rear view of the driver is unobstructed except for the small area covered by the sign or message.

Various means can be provided for hinging the display panel in operative position. A preferred embodiment of the invention utilizes a hook to pivotally support the panel, a thin tip on the hook being insertable between the rear window glass and the adjacent resilient window molding. Other than the hooks on the ends of the cord, there are no support fixtures which have to be attached to the automobile. In its inoperative position the cord is stretched sufficiently taut that it stays close to the roof and out of the way.

Other aspects and advantages of the present invention will become apparent from the following more detailed description taken in conjunction with the accompanying drawings.

BRIEF DESCRIPTION OF THE DRAWINGS

FIG. 1 is a longitudinal cross sectional view schematically illustrating the upper portion of an automobile body, and the location of the present automobile window display apparatus;

FIG. 2 is an enlarged detail view taken in the area indicated by the numeral 2 in FIG. 1;

FIG. 3 is an enlarged detail view taken in the area indicated by the numeral 3 in FIG. 1;

FIG. 4 is a view similar to FIG. 3, but illustrating the display panel in its vertical display position;

FIG. 5 is a front elevational view of the display panel; and

FIG. 6 is an enlarged detail view taken along the line 6—6 of FIG. 3.

DESCRIPTION THE PREFERRED EMBODIMENTS

Referring now to the drawings, the present automobile window display apparatus is illustrated in FIG. 1 in association with an automobile or like vehicle having a front window or windshield 10; a mirror bracket or mount 12 for attaching a rear view mirror to the windshield 10; a roof 14; a rear window 16; and a rear window molding 18 which receives the edge margins of the window to hold it in place.

The display apparatus comprises, generally, a flat, substantially rectangular display panel 20 preferably made of transparent plastic material and, as best seen in FIG. 5, characterized by a pair of mounting openings 22 in its upper edge extremity adjacent its upper corners, and by a similar mounting opening 24 approximately in the middle of the panel adjacent its lower edge extremity.

A message 26 is applied to the panel 20 in any suitable manner, such as by applying adhesive plastic letters made of reflective or fluorescent material. In the example shown, the word "DIM" advises the driver of a following vehicle to dim the vehicle lights. Other informative or emergency messages can be used, as will be apparent.

The display panel is movable between the substantially horizontal retracted position illustrated in FIG. 3 to a substantially vertical display position as illustrated in FIG. 4. In the display position the message 26 is plainly visible from outside the automobile through the rear window 16, but the transparent nature of the panel 20 does not interfere with the driver's view to the rear.

Hinge means are provided for pivotally mounting the upper extremity of the panel 20 to structure of the automobile such as to the window molding 18. The hinge means preferably takes the form of a pair of generally loop or C-shape hooks 28 which, as best seen in FIG. 6, are each characterized by a pointed and flattened tip 30 to facilitate insertion of the hooks between the upper edge of the rear window 16 and the adjacent resilient material of the window molding 18. The resilience of the molding is sufficient to hold the hooks 28 in position during normal use of the display apparatus. Only deliberate downward pulling upon the hooks 28 is effective to dislodge them.

The hooks 28 loosely fit within the mounting openings 22 so that the display panel 20 is freely pivotable within the bights or open portions of the hooks. This allows the panel 20 to pivot or drop freely of its own weight from the position of FIG. 3 to that of FIG. 4 when it is not otherwise restrained.

The present apparatus includes an elongated flexible element such as a string, cable or cord 30 which normally restrains the panel from dropping to its display position. The rearward end of the cord is knotted within the mounting opening 24 of the panel, and its forward end is attached or knotted to a fastener or hook 32 which is hooked onto the usual rear view mirror mount 12, as best seen in FIG. 2. This is a convenient attachment point for the cord, although it will be apparent that fastening means other than the hook 32, or an attachment point other than the mirror mount can be utilized if desired. It is important only that the forward end of the cord 30 be located where it can be conveniently grasped by the driver.

In operation, a driver whose vision is adversely affected by the bright lights of a following vehicle can display the message 26 to remind the driver to dim his or her vehicle lights. This is done by pulling upon the cord 30 enough to stretch it slightly so the hook 32 can be unhooked from the mirror mount 12. The driver then moves his hand rearwardly a short distance to ease off the cord and allow the panel 20 to drop of its own weight to the display position illustrated in FIG. 4.

Location of the panel in the lower, display position can be momentary or prolonged, depending upon the need, following which the driver can raise the panel simply by moving his hand forwardly and re-hooking the cord 30 to the mirror mount 12.

The display panel 20 is out of the way in its retracted position, as shown in FIG. 1, the tautness of the cord 30 being sufficient to maintain the panel in this position without any need for auxiliary supports fastened to the roof 14 or other structure of the automobile. The only semipermanent attachment of the apparatus to the automobile is by means of the hooks 28 inserted underneath the lip of the window molding 18. The hooks can be deliberately manipulated to unseat and withdraw them from the window molding, but normally they are firmly held in position by the panel because, in either its retracted or its display position, the panel pulls upon the hooks 28. This causes the tips 38 to dig into the window molding 18 and thereby maintain the hooks 28 in position.

Because actuation of the apparatus is manual, no electrical connections are necessary, and no part of the apparatus clutters the rear window deck area.

Various modifications and changes may be made with regard to the foregoing detailed description without departing from the spirit of the invention.

What is claimed is:

1. In combination with an automobile having a rear window, a windshield, rear structure adjacent the rear window, and a rear view mirror mount adjacent the windshield, improved window display apparatus comprising:
   a display panel for carrying a message, the panel being adapted to move between a substantially horizontal retracted position and a substantially vertical display position in which the message is visible from outside the automobile through the rear window;
   hinge means pivotally mounting the upper extremity of the panel to the rear structure; and
   an elongated flexible element mounted at its rearward end to the lower extremity of the panel, and including mounting means comprising a hook at the forward end of the flexible element attachable to the rear view mirror mount, the forward end of the flexible element being graspable by a user for demounting the hook from the rear view mirror mount, and for rearward movement with the user's hand to rearwardly move the flexible element and permit the display panel to pivot from the retracted position to the display position.

2. In combination with an automobile having a rear window, a windshield, rear structure comprising resilient window molding around the rear window, and front structure adjacent the windshield, improved window display apparatus comprising:
   a display panel for carrying a message, the panel being adapted to move between a substantially horizontal retracted position and a substantially vertical display position in which the message is visible from outside the automobile through the rear window;
   hinge means comprising a hook having a tip insertable beneath the window molding and pivotally mounting the upper extremity of the panel to the rear structure; and
   an elongated flexible element mounted at its rearward end to the lower extremity of the panel, and separably mounted at its forward end to the front structure, the forward end of the flexible element being graspable by a user for demounting and for rearward movement with the user's hand to rearwardly move the flexible element and permit the display panel to pivot from the retracted position to the display position.

3. The combination according to claim 2 wherein the hinge means is stationary relative to the window molding and the display panel is pivotable relative to the hinge means.

* * * * *